Patented Aug. 28, 1945

2,383,586

UNITED STATES PATENT OFFICE 2,383,586

NOVEL ISOMERIZATION PROCESS

Forrest H. Blanding, Elizabeth, N. J., assignor to Standard Oil Development Company, a corporation of Delaware No Drawing. Application September 4, 1942, Serial No. 457,315

6 Claims. (Cl. 260—683.5)

The present invention relates to the isomerization of normal paraffins containing at least four carbon atoms per molecule, such as normal butane and normal pentane, to produce the corresponding branched chain or iso paraffins by catalytically effecting the reaction in the presence of aluminum halides such as aluminum chloride under isomerization reaction conditions and in the presence of promotional amounts of halogen-containing compounds such as chlorine, bromine, hydrogen chloride, hydrogen bromide, carbon tetrachloride, chloroform, and the lower alkyl halides. Small amounts of water may also be employed but the halogen-containing promoters are preferred.

More particularly, the invention relates to a vapor phase operation in which catalyst beds are formed and the feed stock in vapor phase is passed therethrough. Catalyst beds are in general made up of porous carriers containing sorbed therein and thereon the aluminum halide which is to be activated, and more particularly it has been found desirable in making up these catalyst masses to impregnate with only sufficient aluminum halide so that upon subjecting the catalyst mass to the isomerization reaction conditions no large amounts of aluminum halide vapors are given off but are tenaciously held in the pores of the carrier. This is desirable by reason of the fact that aluminum chloride vapors, for example, when present to any great extent in the reacted effluent tend to condense and deposit in the various lines, valves, stills and the like, necessitating the removal and shutdown for cleaning of these various parts of equipment. In order to form a catalyst mass which is suitable for the reaction, a suitable carrier such as activated carbon, diatomaceous earth, acid-treated clays, Super Filtrol, the bentonitic clays, montmorillonite, bauxite either partially or completely dehydrated such as Porocel, Activated Alumina, alumina gel, silica gel, and the like, is treated in an isomerization reactor with vapors of aluminum chloride, for example, these vapors being passed therethrough and sorbed in the pores of the carrier. The temperature under which this operation is carried out is generally from 50 to 100° in excess of the highest temperature to be employed in an isomerization reaction so that only tenaciously held aluminum chloride is sorbed in the carrier. The aluminum chloride vapors may be introduced by means of a suitable inert carrier gas such as nitrogen, carbon dioxide, dried air, hydrogen, chlorine, hydrogen chloride, or the lower paraffinic gases such as methane and ethane. Also, if desired, this impregnation may be carried out using suitable quantities of the feed stock.

In the customary or conventional procedure a catalyst mass would be prepared, following such a process as given above, which contained between about 8% and about 12% of its weight of aluminum chloride. A particularly good carrier is Porocel, which is a calcined, dehydrated bauxite. The dehydration of this bauxite is carried out to a point substantially below that where water is given off under the isomerization reaction conditions and a suitable pretreatment of the bauxite would be to heat the same from 900 to 1000° F. for from 15 to 18 hours or from 1200 to 1400° F. for from 2 to 3 hours. Still another method of forming the catalyst composition comprises the admixing of solid aluminum chloride with a bauxite followed by heating the mass to impregnate the same and then subjecting this mass as before to a higher temperature than will be encountered in the isomerization reaction and passing an inert gas therethrough in order to remove the loosely held aluminum chloride contained therein. As another alternative in forming such a catalyst, aluminum chloride may be dissolved in a suitable solvent such as ethylene dichloride, ethyl chloride, dioxane and the like, and the porous carrier impregnated with this solution followed by the heating to the desired excess temperatures to drive off not only the solvent but any loosely held aluminum chloride as well.

These methods just described for the preparation of suitable catalyst masses work very well in small scale isomerization units but they are found to possess certain defects which it is the object of this invention to obviate to a great extent. In order to bring out the defects, a consideration of one of these typical catalyst masses will be made. Thus, for example, in a case where aluminum chloride vapors are introduced into a porous carrier such as bauxite or Porocel it has been found that after the catalyst has been prepared and purged with an inert gas to remove loosely held aluminum chloride in a particular instance the inlet side of the catalyst bed contained about 7.25 weight per cent of aluminum chloride. One foot removed from the inlet side of the bed the catalyst contained about 6.06%; two feet removed, about 5.56%; about three feet removed, 4.92%; and at the outlet side of the bed, only about 3.15%. In another instance where aluminum chloride in amounts ranging between about 0.005% and about 0.01% of aluminum chloride based on the feed stock were added continuously during an isomerization reaction, the inlet side of the Porocel mass built up to an aluminum chloride concentration of about 12.85 weight per cent; and at the same levels as indicated previously, the aluminum chloride weight per cents were 9.48, 4.91, 5.25, and the outlet side was about 4.0%. In each of these cases and in the ordinary vapor phase isomerization reaction the fresh feed entering the catalyst bed contacts initially that portion of the catalyst mass which is highest in aluminum chloride and as the mixture becomes more and more reactive and reaches toward equilibrium the amount of catalyst, so far as aluminum chloride concentration is concerned, falls off markedly so that as the reacted mixture is leaving the catalyst bed it contacts the smallest amount of aluminum chloride. In other words, the feed vapors entering the reactor, said vapors being the most susceptible to reaction because they are farthest removed from the equilibrium point, contact the most concentrated catalyst first and excessive reaction at this point results with a tendency towards the poisoning of the rest of the catalyst bed and towards an increased degradation of the feed stock and catalyst. By attempting to maintain the activity of the aluminum chloride in the catalyst mass through the method of adding aluminum chloride vapors to the feed stream to the reaction, the situation is only aggravated and still a greater uneven distribution throughout the bed is achieved.

It is an object of the present invention to obviate to as great an extent as possible the degradation of the aluminum chloride in the isomerization catalyst mass and, as a corollary thereto, to promote an increased catalyst life for the aluminum chloride and an increased yield of the desired isomeric products in contrast to the production of degradation products of the reaction. It is a further object of the invention to so correlate the amount of aluminum chloride present at any specific point in the catalyst bed and in the catalyst carrier so as to maintain a substantially uniform or accelerating catalyst activity as the feed stock passes through the bed. It is a further object of the invention to contact the feed as it becomes more reacted with catalyst mass having higher concentrations of aluminum chloride so as to increase the catalyst life. It is a further object of the invention to more evenly distribute the catalytic activity of the aluminum chloride, not so much on the basis of evenly distributing the aluminum chloride throughout the catalyst mass as to evenly distribute the catalytic activity throughout the catalyst bed.

In order to accomplish the above-stated objects of the invention as well as others which will be apparent upon a fuller understanding of this invention, it is proposed to graduate the concentration of aluminum halide in a porous carrier so that fresh feed stock, upon contacting the mass, will be in the presence of a lower concentration of aluminum halide during the first stages of the reaction and will be in the presence of a greater concentration of aluminum halide in the later stages of the reaction with a substantially uniform increase in the percentage of aluminum halide present between the initial contact point and the final contact point. This of course presupposes that a substantially pure normal paraffinic feed stock will be employed. In cases where field butanes, for example, are employed as the feed stock, while the concentration will vary substantially in the same manner, nevertheless a higher concentration of aluminum halide at the initial or inlet side of the catalyst bed than that employed when using a substantially pure normal paraffinic feed stock will be in order by reason of the fact that while isobutane is present to some extent with the normal butane it is known that the approach to equilibrium has already been to some extent achieved and it is therefore necessary to use larger quantities of aluminum halide initially than are used when isomerizing substantially pure normal paraffinic feed stocks. In general, however, the invention can be carried out by correlating the amount of aluminum halide with respect to the amount of isomerization to be done so that a substantially uniform rate of isomerization may be attained by reason of the feed stock under a given set of reaction conditions contacting a bed or beds of aluminum halide having uniformly progressively increased concentrations of aluminum halide therein so that the feed stock is able to fully utilize the catalytic activity of the aluminum halide while at the same time no excessive catalytic activity takes place which would result in decomposition of the catalyst and the feed stock to form aluminum halide sludges and heavier and lighter hydrocarbon products of the reaction.

One method of forming the catalyst is to introduce aluminum chloride vapors into a partially dehydrated, calcined bauxite, for example Porocel, in a manner similar to those conventional methods heretofore described, but to introduce the normal-paraffin vapors into the isomerization reaction zone containing such a catalyst in a reverse direction from that in which the aluminum chloride vapors were introduced into the porous carrier in making up the catalyst. Or, if desired, the catalyst mass may be prepared by placing aluminum chloride inside the adsorbent bed with preferably about ⅔ of the adsorbent preceding it with respect to the flow of feed into the bed. The catalyst may then be impregnated by blowing heated gases such as nitrogen, carbon dioxide, dried air, etc., through the bed in the reverse direction from that in which the feed is to be passed. It will thus be seen that the feed stock then passes through the carrier containing adsorbed aluminum chloride, said carrier amounting to two-thirds of the total carrier present in the catalyst bed, then through any aluminum chloride which has not been sublimed and adsorbed during the impregnation of the two-thirds portion of the carrier, and finally through the remaining one-third portion of the carrier, said portion being initially relatively free of aluminum chloride and serving during the isomerization as a trap for any aluminum chloride which may be removed from the carrier with the reacted hydrocarbon vapors being removed from the reactor. Also, as heretofore carried out, aluminum chloride vapors may be fed to the reactor at two or more points in the catalyst bed in small portions or in small aliquot portions of the normal paraffin feed stock in order to build up the aluminum chloride concentration of and reactivate a particular section of the catalyst bed during the isomerization reaction. Otherwise, however, it is not desirable to introduce all of the aluminum chloride with the feed stock to the isomerization unit because of the fact that this would defeat the very purpose of the invention by building up aluminum chloride at the inlet side of the catalyst bed. In general, but depending upon the particular porosity characteristics of the carrier, aluminum halide is introduced into the carrier ranging between about 1.5 and about 16 or even as high as 18 weight per cent of the carrier. The amount of aluminum chloride or aluminum bromide introduced into the carrier will of course depend also, as heretofore stated, upon the particular feed stock to be employed, a more concentrated carrier being necessary for the isomerization of field butanes than would be the case for the isomerization of substantially pure normal butane since the field butanes do contain appreciable amounts of isobutane. In general, however, concentrations of aluminum chloride or aluminum bromide on Porocel may range substantially uniformly from between about 1.5 and about 4.0 weight per cent at the inlet side of the catalyst mass, that is, that point in the catalyst mass which first is contacted with the feed stock, up to between about 8 and about 16 weight per cent at the point where the reacted mixture last contacts any aluminum chloride in the catalyst mass. Thus, for example, a typical catalyst is made up in a bed substantially 10 to 15 feet in height and perhaps 2 to 3 feet in diameter. It is prepared as follows:

A stream of gas such as butane or nitrogen is passed over aluminum chloride at an elevated temperature, for example 300° F. to 375° F., preferably at atmospheric pressure, and thence the mixture is passed downwardly through Porocel at the same or slightly higher temperature wherein the aluminum chloride is absorbed. An amount of aluminum chloride equivalent to 8 weight per cent of the carrier is used. When this aluminum chloride has been substantially carried into the catalyst bed, the composition of the resulting catalyst is, at the bottom or feed inlet side, about 3.5% of aluminum chloride; at the 2-foot level, about 4.5%; at the 4-foot level, about 6%; at the 6-foot level, about 8%; at the 8-foot level, about 10%; and at the 10-foot level, about 12%. This concentration gradient may be varied somewhat by varying the rate of flow of the carrier gas and the temperature of the catalyst bed. A layer of unimpregnated Porocel of 3 to 5 feet remains above the 10-foot level, or above wherever the aluminum chloride was passed in. Normal butane at a temperature between about 200° F. and 375° F. in conjunction with a suitable halogen-containing promoter is then passed upwardly through this catalyst mass and the reacted mixture treated for the recovery of isobutane therefrom.

At such time, after the activity of the catalyst bed begins to drop, aluminum chloride is added to the catalyst bed in portions of the normal paraffin hydrocarbon feed, one portion in the feed stream to the inlet of the catalyst bed to replenish aluminum chloride which has been carried by the reactant further upwards into the bed, and to reactivate the surface of this initial catalyst, a second portion at the 4-foot level in the bed and a third portion at the 8-foot level in the bed so as to both maintain the concentration gradient desired and also reactivate all portions of the catalyst in the bed.

The feed stock employed may be any one of a number of common types available. Among the particular feed stocks which are useful are the following: normal butane, normal pentane, normal hexane, normal heptane, 2-methyl pentane and higher homologues, and/or mixtures of two or more of these normal or only slightly branched paraffins such as natural mixtures of field butanes, casinghead gasoline, straight run naphthas, and the like.

In order to preserve the life of the aluminum chloride or aluminum bromide catalyst mass, it has been found desirable to pretreat the feed stocks employed in order to remove therefrom water, olefins, sulfur compounds and the like. The olefins and water are removed by first treating with concentrated sulfuric acid of the order of 90-98% or by the use of chlorsulfonic or fluorsulfonic acid of suitable concentrations. Caustic solutions are employed for the removal of sulfur compounds.

The halogen-containing promoters are employed in amounts ranging between 1% and about 16%, preferably in amounts ranging between about 2% and about 8%, based on the normal paraffins charged. Higher amounts of promoter may be employed and the reaction may also be carried out in the presence of elemental or free hydrogen. The time of contact employed in the reaction may vary considerably but in general the feed rate is between about 0.2 and about 5 liquid volumes of feed stock per volume of catalyst per hour and the temperature is maintained in the range between about 150° F. and about 400° F., preferably between about 200° F. and about 375° F. in the case of normal butane isomerization, or temperatures of about 50° lower in the case of normal pentane isomerization. Pressures ranging from atmospheric up to about 350 or even as high as 800 lbs./sq. in. may be employed but in general these pressures are adjusted between about 150 and about 300 lbs./sq. in., or in the case of normal pentane between about 50 and about 100 lbs./sq. in. However, the highest pressure which will yet insure substantially no liquid condensing or coming in contact with catalyst anywhere in the system has been found advantageous in that it permits smaller reactors and beds of aluminum chloride per unit output to be used. The promoter of course may be recycled to the isomerization unit or it may be subjected to an absorption treatment to remove any methane, ethane, propane and lighter degradation products which may have formed during the reaction.

No particular or special type of apparatus or construction is necessary in carrying out the process of the present invention. It may be carried out in either batch or continuous operation, although it is preferred and finds it highest utility in a continuous type of operation. Reactors are generally of the type employed for solid catalyst type reactions using perforated plates or baskets or other suitable means for the deposition of the catalyst mass and for allowing the free passage of vapors therethrough. The reactor may be a single one or a plurality of reactors arranged in series or parallel and it is not necessary that all the concentrations of aluminum halide in the catalyst carrier be contained in a single bed. Thus, for example, instead of a single bed 15 feet in height ranging from 2½ to 12 feet of aluminum chloride from top to bottom, a plurality of beds arranged in series may be employed in which the first bed contains aluminum chloride ranging from 2½ up to, say, 5 feet concentration, the rest being porous carrier, and the second bed may range from 5 to 10 feet, and the third bed from 10 to 12 feet, and so forth.

The catalyst may be regenerated upon becoming spent or substantially spent by heating the same to drive off any aluminum chloride as vapor and then increasing the temperature to 700-1000° F. and passing free oxygen or free-oxygen-containing gases through the carrier to remove and burn off the carbon contained therein. The amount of free oxygen contained in the purging gases may be controlled by dilution with inert gases such as nitrogen or carbon dioxide and the carrier may also be treated with chlorine in order to activate the same. The pores of the catalyst may then be reimpregnated with aluminum chloride in the manners previously described.

Having now thus described and illustrated the character of the invention, what is desired to be secured by Letters Patent is:

1. A process which comprises passing normal butane at between about 0.5 and about 5 liquid volumes per volume of catalyst per hour at a temperature between about 200° F. and about 375° F. under a pressure of between about 150 and about 300 lbs./sq. in. in admixture with promotional amounts of a hydrogen halide through a catalyst bed of aluminum chloride sorbed on a partially dehydrated bauxite, the aluminum chloride concentration substantially uniformly increased from between about 1.5 and about 4.0 weight per cent of the bauxite at the feed inlet side of the bed to between about 8 and about 16 weight per cent of the bauxite at the outlet side of the bed, and recovering isobutane from the reacted mixture.

2. A process as in claim 1 wherein the hydrogen halide is hydrogen chloride present in an amount between about 2 and about 8 weight per cent of the normal butane, wherein the aluminum chloride concentration at the inlet side is about 2.5 weight per cent and at the outlet side about 12 weight per cent, and wherein the reacted mixture is passed through a layer of bauxite originally substantially free of aluminum chloride prior to leaving the isomerization reaction zone.

3. A process which comprises isomerizing normal pentane at a temperature between about 150° F. and about 225° F. at a throughput of about 0.75 and about 2.5 liquid volumes per volume of catalyst per hour under a pressure between about 50 and about 100 lbs./sq. in admixture with promotional amounts of a hydrogen halide by passing through a catalyst bed of aluminum chloride sorbed in partially dehydrated bauxite, the aluminum chloride concentration substantially uniformly increased from between about 1.5 and about 4.0 weight per cent of the bauxite at the feed inlet side to between about 8 and about 16 weight per cent of the bauxite at the reacted mixture outlet side of the bed, and recovering isopentane from the reacted mixture.

4. A process as in claim 3 wherein the hydrogen halide is hydrogen chloride present in an amount between about 2 and about 8 weight per cent of the normal pentane, wherein the aluminum chloride concentration at the inlet side is about 2.5 weight per cent and at the outlet side about 12 weight per cent, and wherein the reacted mixture is passed through a layer of a partially dehydrated bauxite originally substantially free of aluminum chloride prior to leaving the isomerization reaction zone.

5. A process which comprises isomerizing at least one normal paraffin containing at least 4 carbon atoms per molecule in the vapor phase by passing said paraffin through a catalyst bed of aluminum chloride sorbed in a porous carrier, the aluminum chloride concentration substantially uniformly increasing from between 1.5 and about 4.0 weight per cent of the porous carrier at the feed inlet side of the bed to between about 8 and about 16 weight per cent of the porous carrier at the outlet side of the bed, and carrying out the isomerization in the presence of promotional amounts of a halogen-containing promoter under isomerization reaction conditions.

6. A process which comprises isomerizing at least one normal paraffin containing at least four carbon atoms per molecule in the vapor phase by passing said paraffin through a catalyst bed comprising a partially dehydrated calcined bauxite containing aluminum chloride, said catalyst bed being prepared by passing a mixture of aluminum chloride vapors and butane vapors downwardly through the bauxite bed, then passing an inert gas through the bed upwardly while maintaining the temperature of from 0° to 150° F. in excess of the highest temperatures to be employed in the isomerization reaction so as to purge the mass of loosely sorbed aluminum chloride, said bed substantially uniformly varying in concentration of aluminum chloride so that the feed stock first contacts the catalyst having a lower concentration and then contacts the catalyst mass having higher concentration of aluminum chloride, contacting the highest aluminum chloride concentration lastly, in the presence of promotional amounts of a halogen-containing promoter and under isomerization reaction conditions, the highest aluminum chloride concentration in the said catalyst bed being maintained below that concentration at which substantial amounts of aluminum chloride are vaporized from the bauxite under the prevailing reaction conditions.

FORREST H. BLANDING.